US012565047B2

(12) United States Patent
Anderson, Jr.

(10) Patent No.: US 12,565,047 B2
(45) Date of Patent: Mar. 3, 2026

(54) CARRIAGE FOR FLUID EJECTION CARTRIDGE

(71) Applicant: Brady Worldwide, Inc., Milwaukee, WI (US)

(72) Inventor: James D. Anderson, Jr., Lexington, KY (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 163 days.

(21) Appl. No.: 18/482,124

(22) Filed: Oct. 6, 2023

(65) Prior Publication Data

US 2025/0115050 A1 Apr. 10, 2025

(51) Int. Cl.
*B41J 2/175* (2006.01)

(52) U.S. Cl.
CPC ......... *B41J 2/1752* (2013.01); *B41J 2/17526* (2013.01)

(58) Field of Classification Search
CPC .... B41J 2/1752; B41J 2/17526; B41J 2/1753; B41J 2/17553
See application file for complete search history.

(56) References Cited

U.S. PATENT DOCUMENTS 5,798,777 A * 8/1998 Yoshimura ........... B41J 2/16508 347/29
6,224,192 B1 * 5/2001 Robinson ............... B41J 2/1752 347/49
6,508,547 B2 * 1/2003 King ...................... B41J 2/1752 347/86
6,695,436 B2 2/2004 Jang et al.
6,736,486 B2 5/2004 Nakamura et al.
7,178,909 B2 * 2/2007 Yoshiyama .......... B41J 2/17513 347/49
7,275,809 B2 10/2007 Uwagaki et al.
7,300,142 B1 * 11/2007 Usui .................... B41J 2/17533 347/85
7,452,066 B2 11/2008 Tsuji
8,297,738 B1 * 10/2012 Kodama .............. B41J 2/17546 347/49
8,366,253 B2 2/2013 Iwata et al.
2006/0164480 A1 * 7/2006 Harada ................ B41J 2/17553 347/86

* cited by examiner

*Primary Examiner* — Anh T Vo
(74) *Attorney, Agent, or Firm* — Brianna Schonenberg

(57) ABSTRACT

A cartridge carriage and method for reducing damage to flexible circuits on fluid ejection cartridges. The carriage includes cavity therein configured to hold a fluid ejection cartridge in a fluid ejection device. The cavity includes opposing side walls attached to a front wall, a bottom wall attached to the opposing side walls perpendicular to the front wall, and a top wall distal from the bottom wall attached to the side walls and front wall. The front wall has a plurality of electrical contact pins and a first support ledge disposed apart from the electrical contact pins between the electrical contact pins and top wall. The first support ledge is configured to abut a first cartridge projection of the first fluid ejection cartridge to align the first fluid ejection cartridge with the plurality of electrical contact pins when the first fluid ejection cartridge is latched into the cartridge carriage.

14 Claims, 8 Drawing Sheets

CARRIAGE FOR FLUID EJECTION CARTRIDGE

TECHNICAL FIELD

The disclosure is directed to an improved carriage for a fluid ejection cartridge and a method for reducing damage to a flexible circuit of a fluid ejection cartridge.

BACKGROUND AND SUMMARY

Fluid ejection devices such as printers and digital dispense devices 10 (FIG. 1) include a cartridge carriage 12 (FIG. 2) for moving a fluid dispensing cartridge over a fluid receiving substrate in an x-direction. For some applications, the fluid ejection cartridges have a single fluid ejection head or multiple ejection heads having a swath size of about 6 to about 13 millimeters. For other applications, a larger ejection head is used having a swath size of about 25 to 26 millimeters. Ejection heads having larger or smaller swath sizes may also be used. Conventional cartridge carriages are typically designed for only one swath size fluid ejection cartridge.

With reference to FIGS. 3 and 4, in order to align a fluid ejection cartridges 14 within a conventional cartridge carriage 16, the cartridge carriage has a nose piece opening 18 that is designed to engage a nose piece 20 of the fluid cartridge. The nose piece 20 includes the fluid ejection head. Since different swath size cartridges have different size nose pieces, the cartridge carriage 16 is often compatible with only a single fluid cartridge size and/or swath size. A different cartridge carriage must be used if the fluid ejection head and nose piece is larger or smaller than the fluid ejection head and nose piece 20 of the fluid ejection cartridge 14.

The cartridge carriage 16 also includes contact pins 22 that are used to contact pads 24 on a flexible circuit attached to the fluid ejection cartridge 14 to provide electrical control for fluid ejection. The nose piece opening 18 of the cartridge carriage 16 is designed to provide a horizontal force on the nose piece 20 in the direction of arrow 26 to force the cartridge 14 toward the contact pins 22. In order to properly insert the nose piece 20 of the fluid cartridge 14 into the cartridge carriage 16 an insertion technique is used that causes the contact pads 24 on the flexible circuit to scrape across the contact pins 22 resulting in circuit tears which can cause circuit shorts if the power is not off when installing and removing the fluid cartridge 14 from the cartridge carriage 16.

With the cartridge carriage 16 described above, there is a latch mechanism 28 to hold the fluid cartridge 14 in the cartridge carriage 16 that is designed to apply a perpendicular force to the fluid cartridge 14 in the direction of arrow 30. The conventional latch mechanism 28 has a handle section 32 and a U-shaped biasing structure 34 that is pivotally connected to the cartridge carriage 16. When the latch mechanism 28 is being engaged with the cartridge 14, the handle section 32 may snap down to contact a side of the fluid cartridge 14. A latch mechanism 28 with a handle section 32 that can snap down and contact the fluid cartridge 14 may cause air to be ingested into the cartridge 14 through the ejection head which can cause operational problems with the fluid cartridge 14.

Accordingly, what is needed is a single cartridge carriage that will allow the use of a variety of fluid cartridge sizes and swath sizes and also avoid problems associated with damaged electrical contacts and air ingestion as described above.

In view of the foregoing, an embodiment of the disclosure provides a cartridge carriage and method for reducing damage to flexible circuits on fluid ejection cartridges. The carriage includes cavity therein configured to hold a fluid ejection cartridge in a fluid ejection device. The cavity includes opposing side walls attached to a front wall, a bottom wall attached to the opposing side walls perpendicular to the front wall, and a top wall distal from the bottom wall attached to the side walls and front wall. The front wall has a plurality of electrical contact pins and a first support ledge disposed apart from the electrical contact pins between the electrical contact pins and the top wall. The first support ledge is configured to support a cartridge projection of the first fluid ejection cartridge to align the first fluid ejection cartridge with the plurality of electrical contact pins when the first fluid ejection cartridge is latched into the cartridge carriage.

In another embodiment, there is provided a cartridge carriage configured to hold a plurality of different fluid ejection cartridge sizes for a fluid ejection device. The cartridge carriage has opposing side walls attached to a front wall, a bottom wall attached to the opposing side walls perpendicular to the front wall, and a top wall distal from the bottom wall attached to the side walls and front wall. The opposing side walls, front wall, bottom wall, and top wall together define a cavity therein configured for the plurality of different fluid ejection cartridge sizes. The front wall includes a plurality of electrical contact pins and at least two spaced-apart support ledges between the electrical contact pins and the top wall. A first one of the two spaced-apart support ledges is configured to support a first cartridge projection of a first fluid ejection cartridge to align the first fluid ejection cartridge with the plurality of electrical contact pins when the first fluid ejection cartridge is latched into the cartridge carriage and a second one of the two spaced-apart support ledges is configured to abut a second cartridge projection of a second fluid ejection cartridge to align the second fluid ejection cartridge with the plurality of electrical contact pins when the second fluid ejection cartridge and an adapter therefor are latched into the cartridge carriage.

In some embodiments, the cartridge carriage further includes a latch attached to the end of the side walls adjacent to the top wall. The latch has a lever pivotally attached at a first end of the lever to the latch wall and a biased plunger pivotally attached on a pivot end of the biased plunger to the lever distal from the first end of the lever. A distal end of the biased plunger is configured to engage a sloped surface of the first fluid ejection cartridge.

In some embodiments, the distal end of the biased plunger is configured to apply both x and y directional forces to the sloped surface of the first fluid ejection cartridge.

In some embodiments, the lever has a nub on the first end thereof configured to prevent the distal end of the lever from contacting the first fluid ejection cartridge.

In some embodiments, the latch mechanism has a biasing device attached to the distal end of the biased plunger, wherein the biasing device is configured to engage the first end of the lever opposite the nub. In some embodiments, the biasing device is a coil spring. In other embodiments, the biasing device is a resilient elastomeric structure in the shape of a cylinder or a bellows.

In some embodiments, there is provided a cartridge adapter and second support ledge disposed apart from the electrical contact pins between the electrical contact pins and the first support ledge, wherein the second support ledge is configured to abut a second cartridge projection of a second fluid ejection cartridge to align the second fluid ejection cartridge with the plurality of electrical contact pins when the second fluid ejection cartridge and cartridge adapter are latched into the cartridge carriage.

In some embodiments, the bottom wall has an opening therein configured for one or more fluid ejection heads and for multiple ejection head sizes.

In some embodiments, opposing side walls further of the cartridge carriage have a recess therein configured for guiding the first and second fluid ejection cartridges into the cartridge carriage.

In some embodiments, cartridge adapter is provided and attached to the fluid ejection cartridge prior to tilting the fluid ejection cartridge in the first direction while inserting the fluid ejection cartridge into the cavity so that the fluid ejection cartridges is tilted toward the second support ledge.

An advantage of the disclosed embodiments is that a cartridge carriage may be used that can accommodate a variety of fluid ejection cartridges while also reducing damage to flexible circuits on the cartridges when inserting the cartridges into the carriage.

BRIEF DESCRITION OF THE DRAWING

DETAILED DESCRIPTION OF THE EMBODIMENTS

Figure 1:
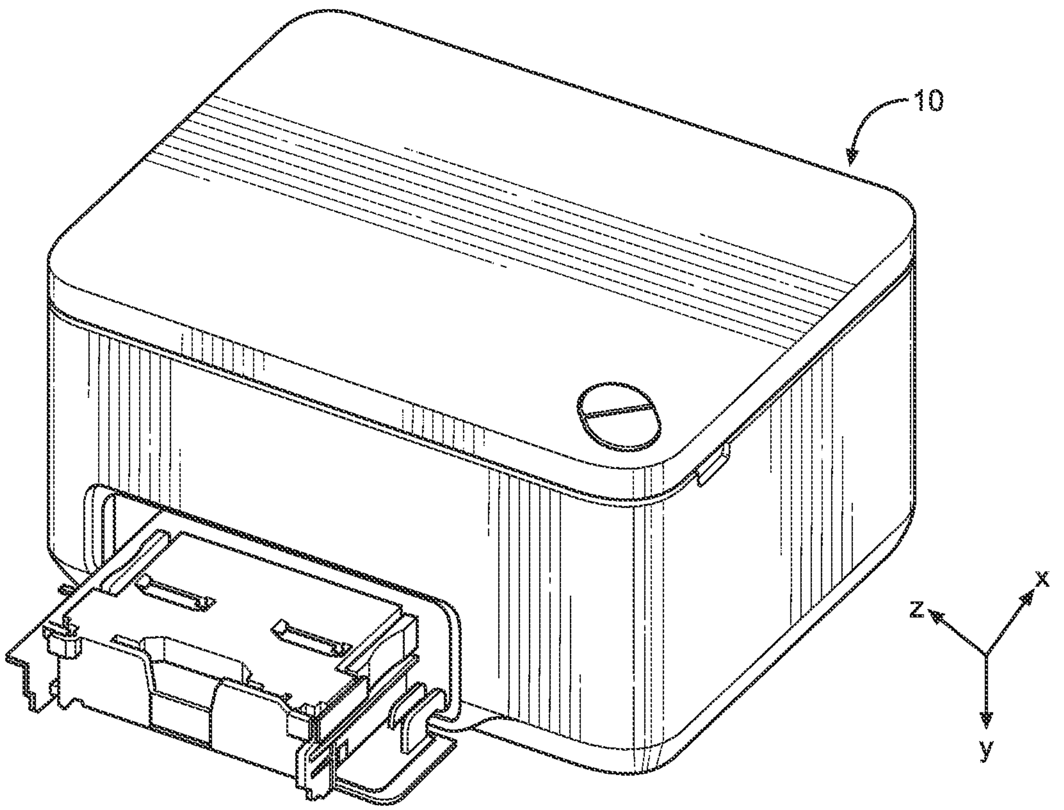
FIG. 1 is a perspective view, not to scale, of a fluid ejection device according to an embodiment of the disclosure.
Figure 2:
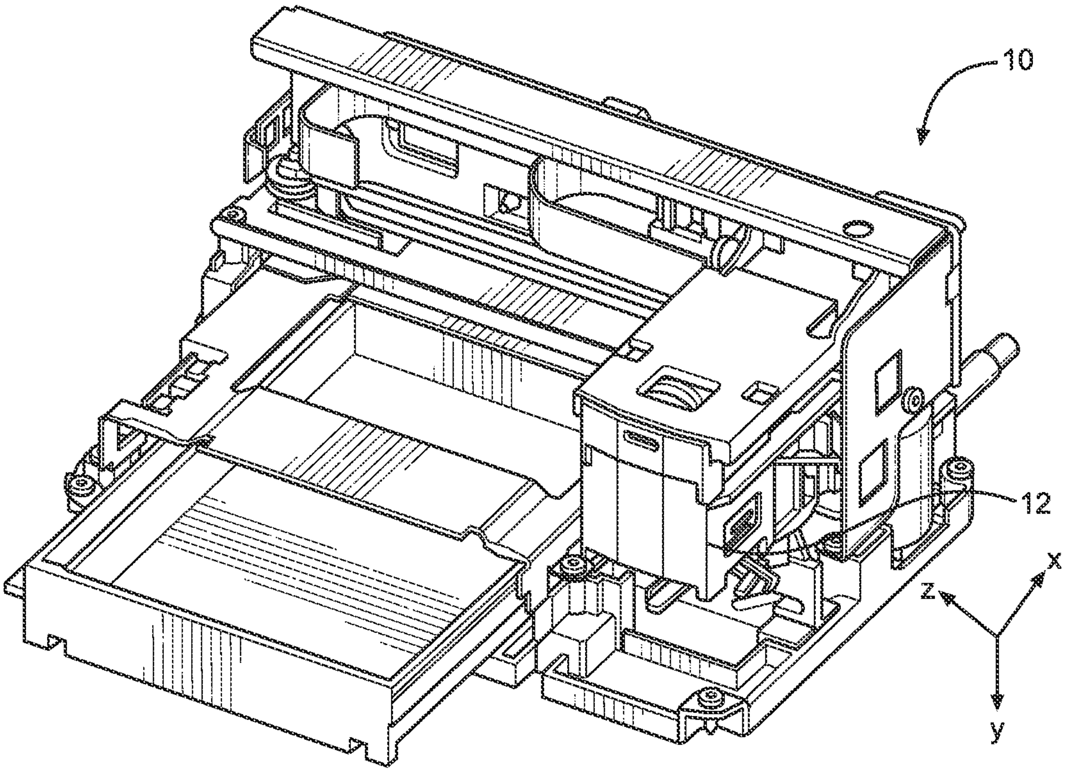
FIG. 2 is a perspective inside view, not to scale, of the fluid ejection device of FIG. 1.
Figure 3:
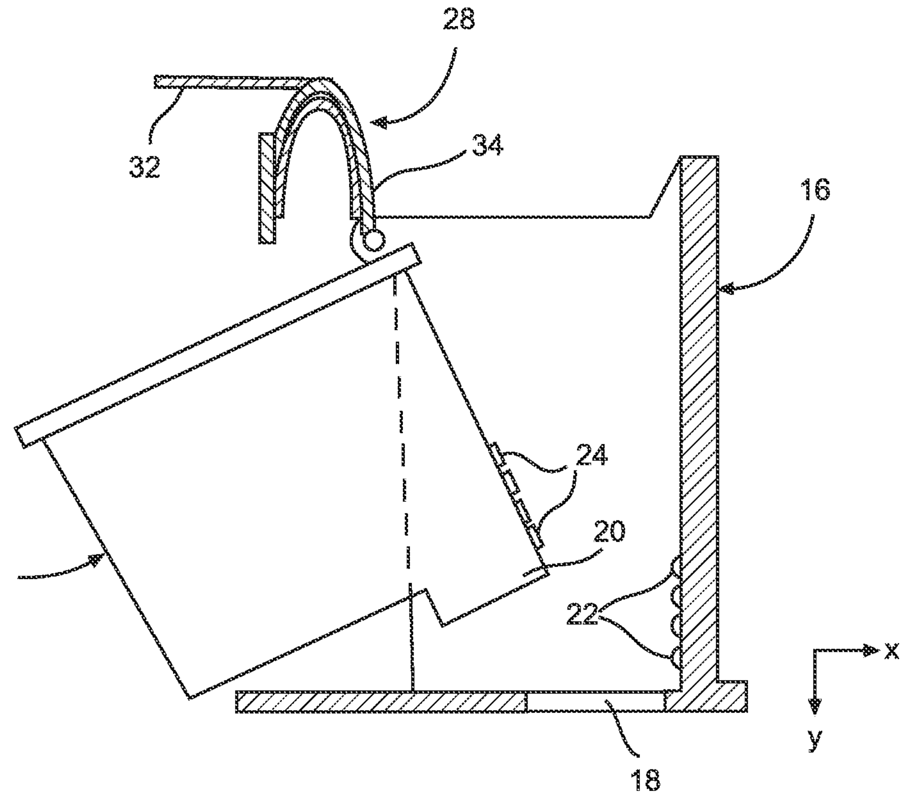
FIG. 3 PRIOR ART
FIGS. 3 and 4 are elevational views, not to scale, of a prior art cartridge carriage for a fluid ejection cartridge.
Figure 4:
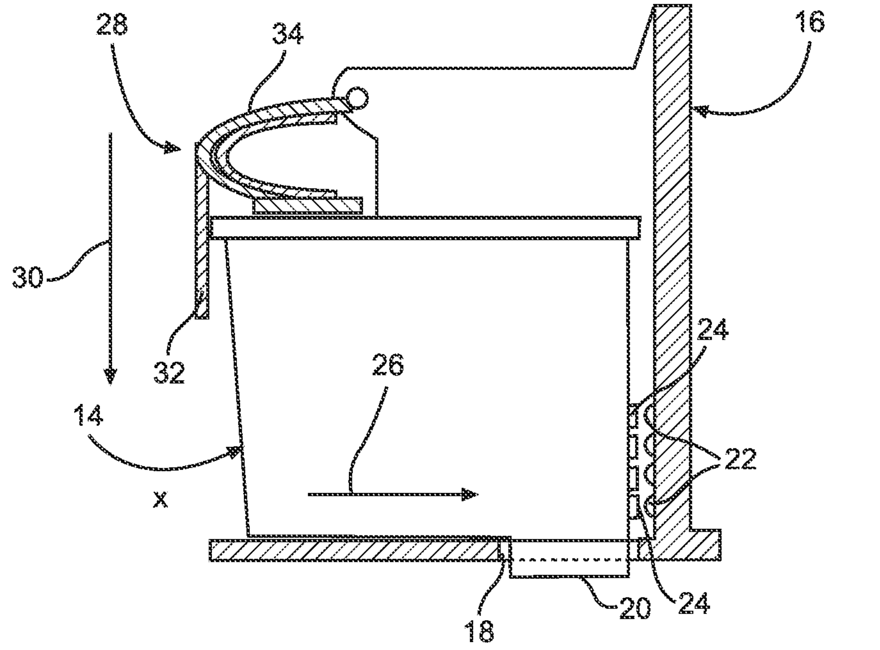
FIG. 4 PRIOR ART
Figure 5:
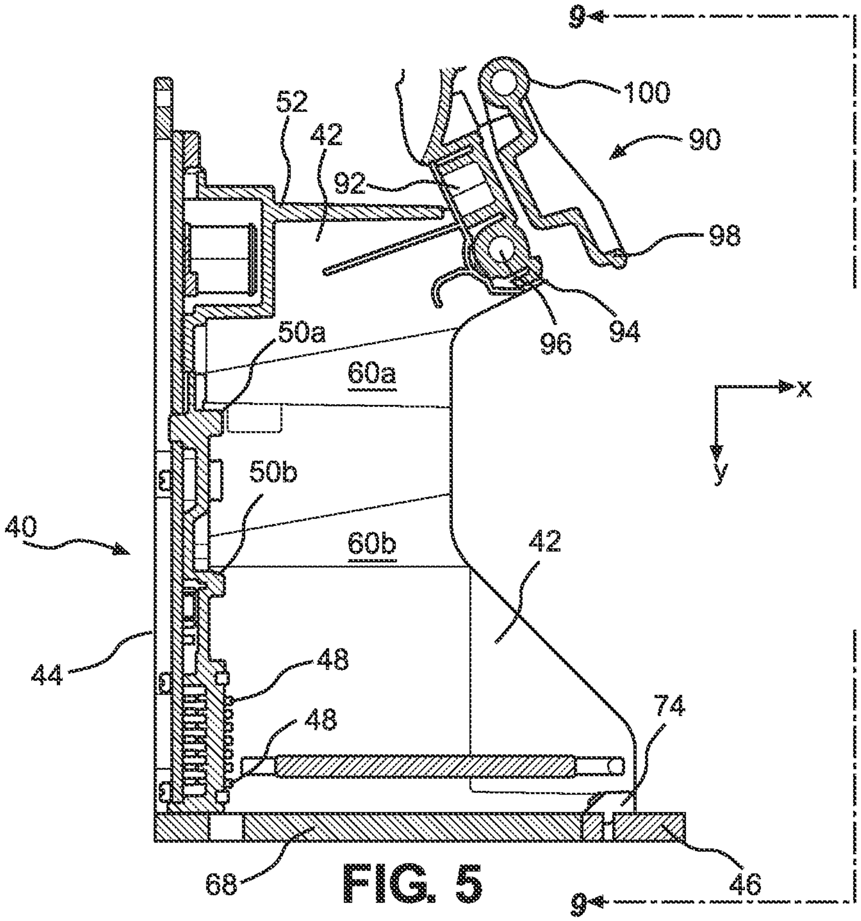
FIG. 5 is a cross-sectional view, not to scale of a cartridge carriage according to an embodiment of the disclosure.
Figure 6:
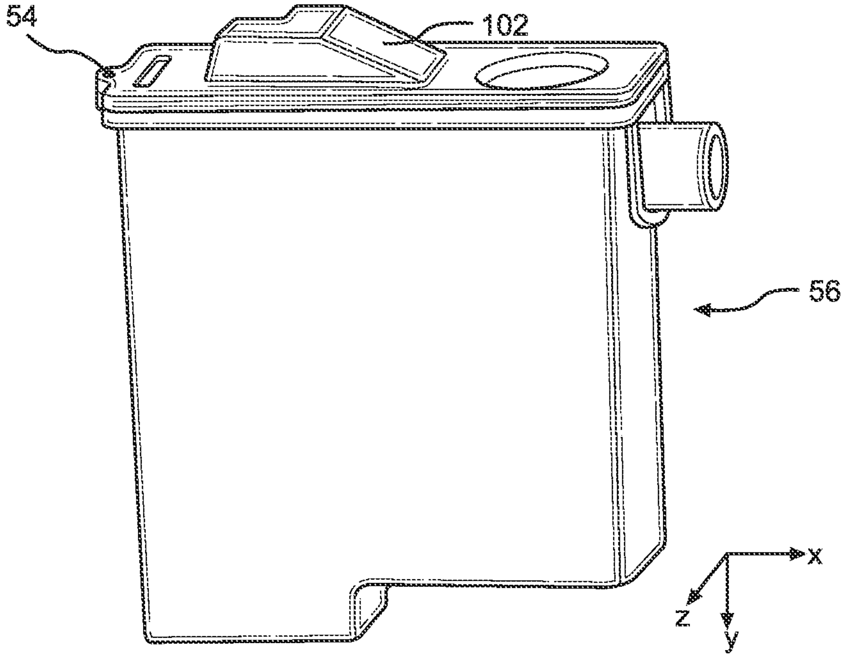
FIG. 6 is a perspective view, not to scale, of a fluid ejection cartridge for use with the cartridge carriage of FIG. 5.

For the purposes of this disclosure, the terms "carriage" and "cartridge carriage" refer to a stationary cartridge holder or a moving cartridge holder within a fluid dispensing device including, but not limited to, a printer or other fluid dispense device. With reference to FIG. 5, there is illustrated in a cross-sectional view, a cartridge carriage 40 according to an embodiment of the disclosure. The cartridge carriage 40 includes opposing side walls 42 attached to a front wall 44, a bottom wall 46 attached to the opposing side walls 42 perpendicular to the front wall 44, and a top wall 52 distal from the bottom wall 46 attached to the side walls 42 and front wall 44. The front wall 44 comprises a plurality of electrical contact pins 48 and a first support ledge 50*a* disposed apart from the electrical contact pins between the electrical contact pins 48 and top wall 52. The first support ledge 50 is configured to abut a first cartridge projection 54 of a first fluid ejection cartridge 56 (FIG. 6) to align the first fluid ejection cartridge 56 with the plurality of electrical contact pins 48 when the first fluid ejection cartridge 56 is latched into the cartridge carriage 40.

Figure 7:
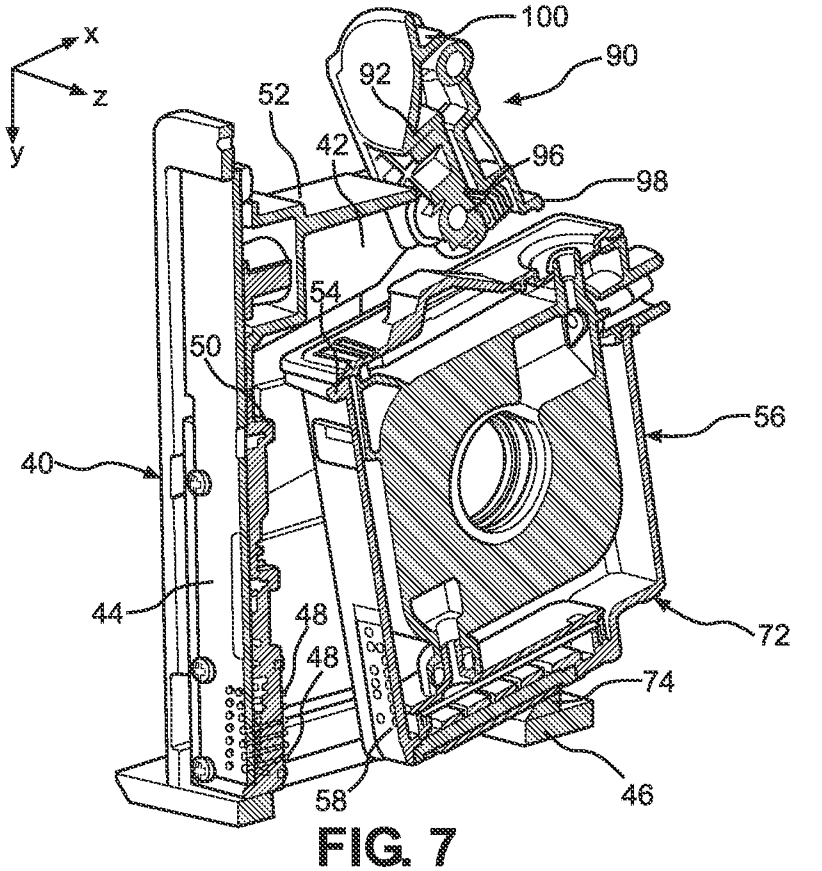
FIG. 7 is a cross-sectional, perspective view, not to scale, of a fluid ejection cartridge being inserted into the cartridge carriage of FIG. 5.
Figure 8:
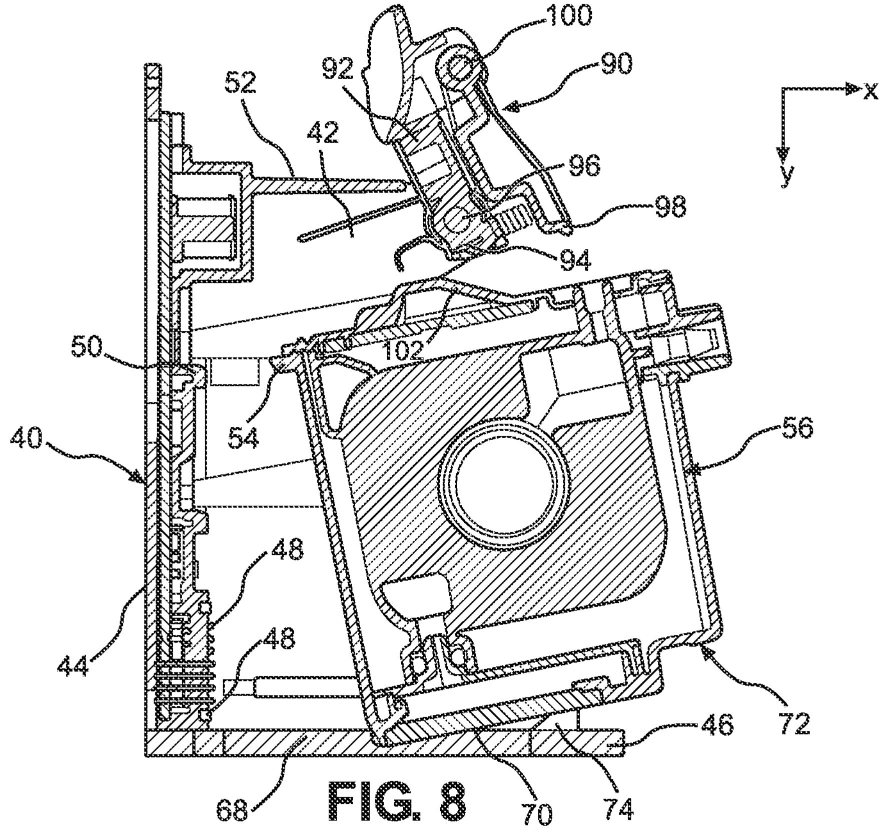
FIG. 8 is a cross-sectional view, not to scale, of the fluid ejection cartridge and cartridge carriage of FIG. 7.
Figure 9:
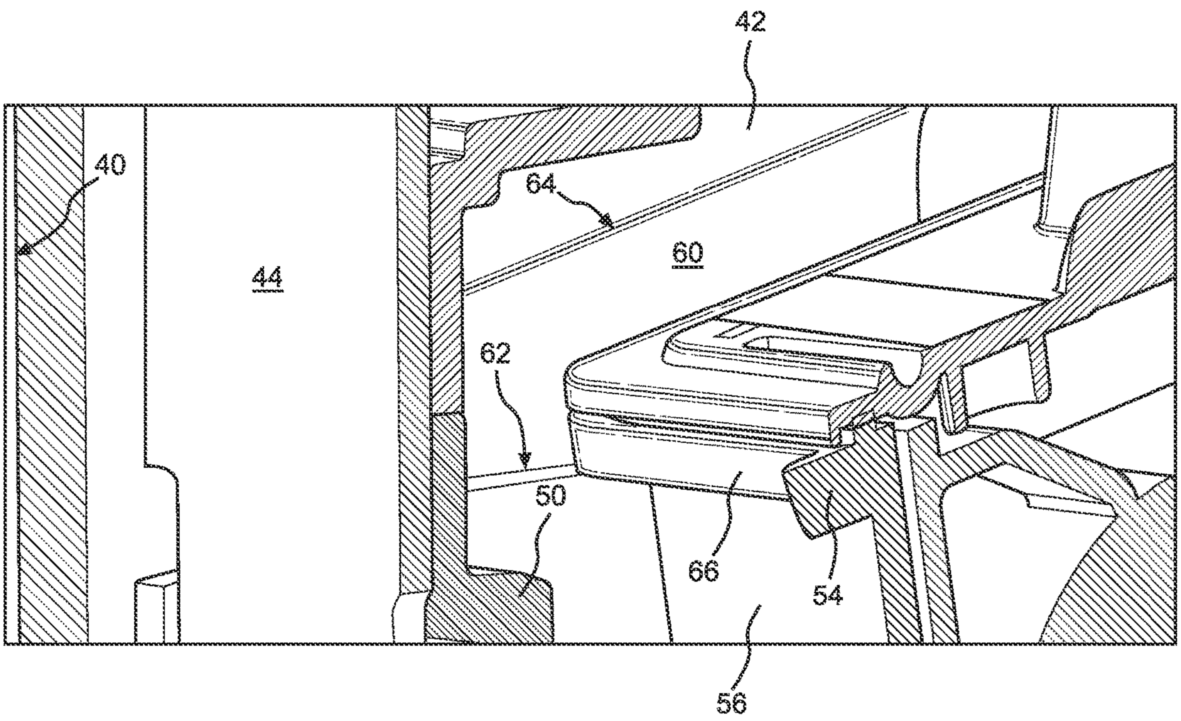
FIG. 9 is a partial perspective view, not to scale, of the cartridge carriage and fluid ejection cartridge of FIG. 7.

Cross-sectional views of the first fluid ejection cartridge 56 and carriage 40 according to the disclosure are illustrated in FIGS. 7 and 8. In FIGS. 7 and 8, the fluid ejection cartridge 56 is angled for insertion into the cartridge carriage 40 so that the cartridge projection 54 can abut the first support ledge 50 prior to the contact pins 48 coming in contact with contact pads on the flexible circuit 58 thereby reducing or eliminating possible damage to the flexible circuit 58 by the contact pins 48. The amount the fluid ejection cartridge 56 is angled may range from about 8 degrees to about 12 degrees from a the final position of the fluid ejection cartridge 56 in the cartridge carriage. Also shown in more detail in FIG. 9 is a recessed area 60 of the side wall 42 defined by a guide ledge 62 and concave area beginning at arrow 64. The recessed area 60 provides a guide area for the cover flange 66 of the fluid ejection cartridge 56 as the cartridge 56 is inserted into the cartridge carriage 40. Referring again to FIG. 8. The opening 68 in the bottom wall 46 is large enough to accommodate multiple swath size ejection heads 70 as described in more detail below. Referring again to FIG. 5, in some embodiments, the cartridge carriage 40 includes a first support ledge 50*a* and a second support ledge 50*b* for different size fluid ejection cartridges. The support leges 50*a* and 50*b* are spaced-apart from one another on the cartridge carriage 40. There are also multiple recessed areas 60*a* and 60*b* corresponding to the support ledges 50*a* and 50*b* as described above.

Figure 10:
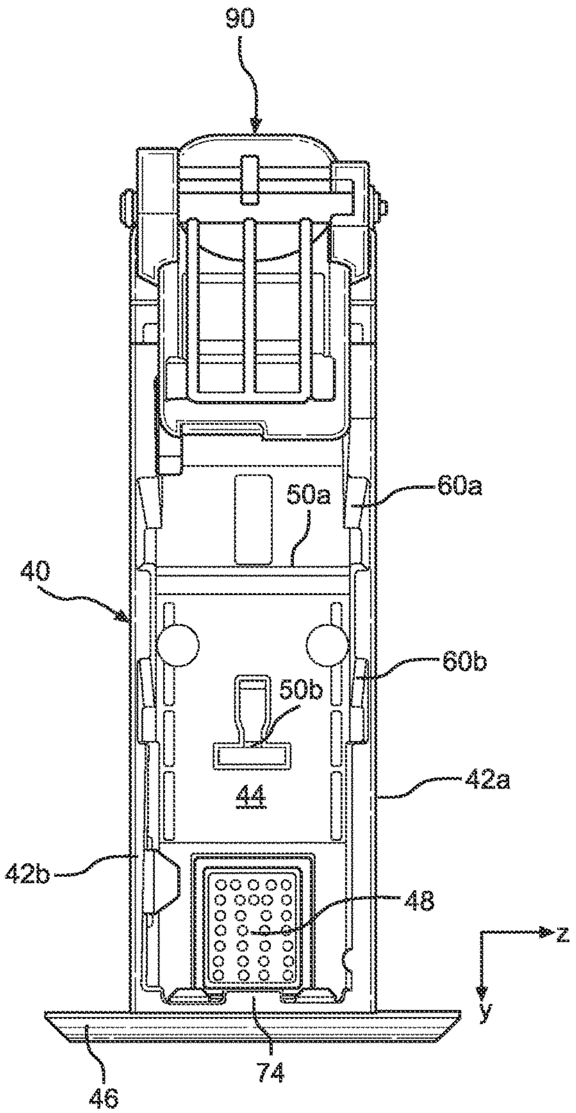
FIGS. 10-11 are end views, not to scale, of the cartridge carriage and cartridge carriage plus fluid ejection cartridge of FIGS. 5 and 6.
Figure 11:
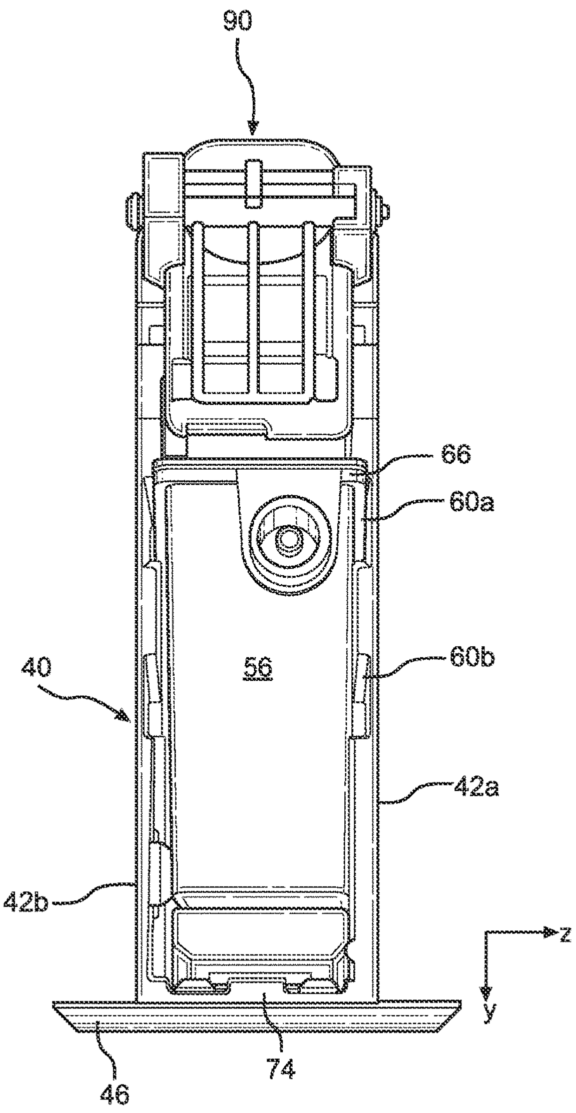

FIG. 10 is an inside view of the cartridge carriage 40 of FIG. 5 with the fluid ejection cartridge being absent from the cartridge carriage 40. FIG. 11 is a representation of the fluid ejection cartridge 56 inserted into the cartridge carriage 40. When the fluid ejection cartridge is fully inserted into the cartridge carriage 40, a bottom wall 72 of the fluid ejection cartridge 56 is in contact with a bottom wall datum 74 on the bottom wall 46 of the cartridge carriage 40. In some embodiments, the fluid cartridge 56 is rotated so that the bottom wall of the fluid ejection cartridge 56 contacts the bottom wall datum 74.

Figure 12:
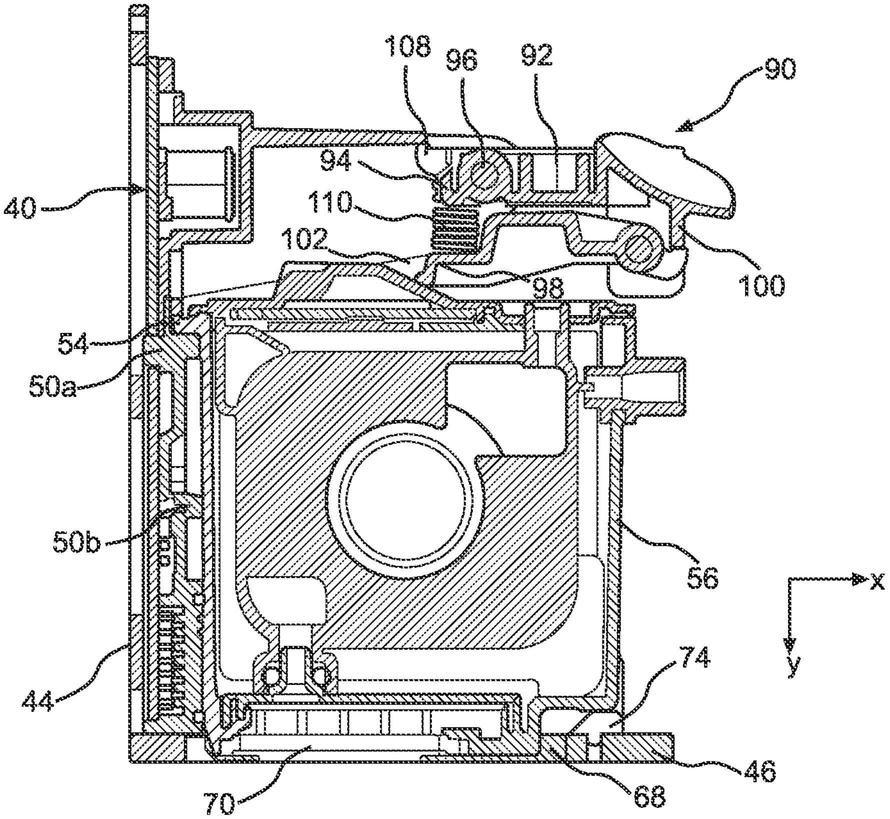
FIG. 12 is a cross-section view, not to scale, of the cartridge carriage of FIG. 5 and a fluid ejection cartridge having a first ejection head size.
Figure 13:
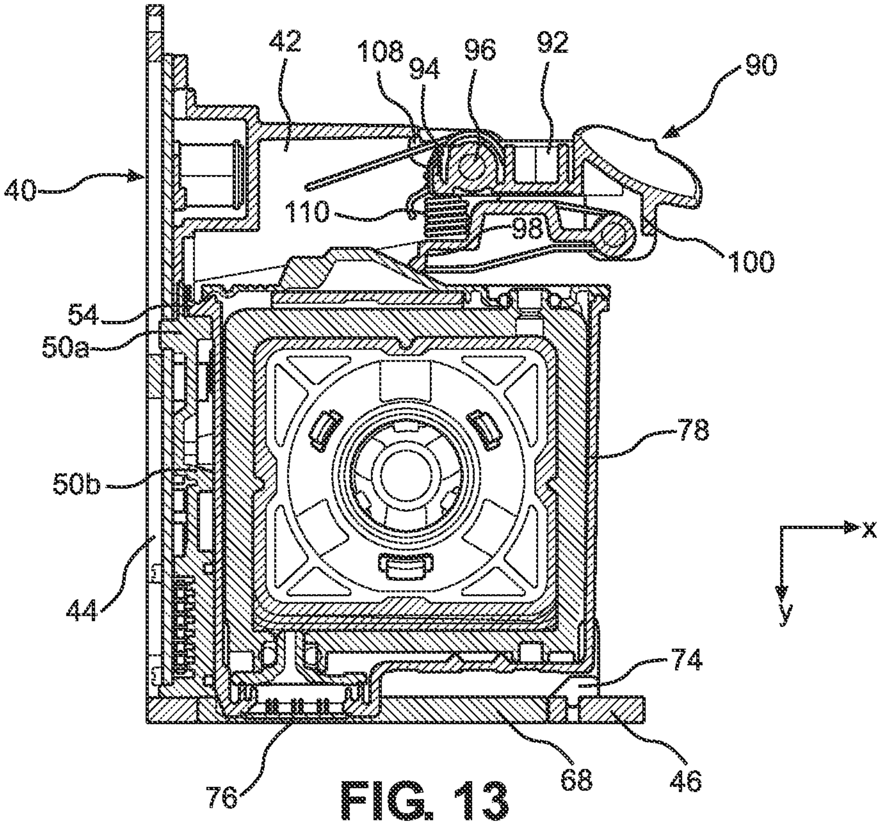
FIG. 13 is a cross-section view, not to scale, of the cartridge carriage of FIG. 5 and a fluid ejection cartridge having a second ejection head size.
Figure 14:
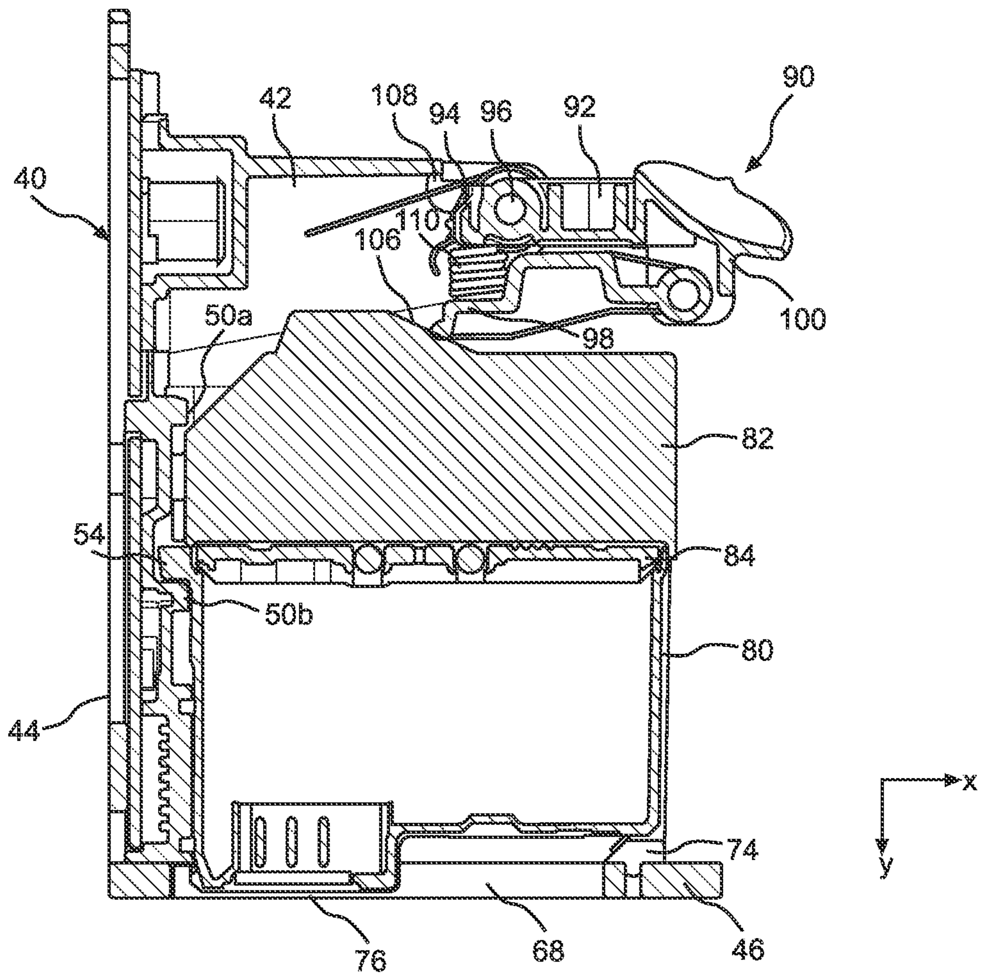
FIG. 14 is a cross-sectional view, not to scale, of the cartridge carriage of FIG. 5 and a reduced sized fluid ejection cartridge.

The cartridge alignment features of the disclosed embodiments enable the use of the cartridge carriage 40 with different size fluid ejection cartridges as illustrated in FIGS. 12-14. In FIG. 12, the cartridge carriage 40 has an opening 68 that is sufficient to accommodate the relatively large swath ejection head 70 of fluid ejection cartridge 56. In FIG. 13, the same cartridge carriage 40 can also accommodate a much smaller swath ejection head 76 of fluid ejection cartridge 78. Likewise, the cartridge carriage 40 may be able to accommodate a much smaller fluid ejection cartridge 80 by using support ledge 50*b* instead of support ledge 50*a* as shown in FIG. 14. In order to use the smaller fluid ejection cartridge 80, an adapter 82 is attached to a cover 84 of the fluid ejection cartridge 80. The adapter 82 allows the smaller fluid ejection cartridge 80 to be latched into the cartridge carriage 40 using the same latch used for the relatively larger size fluid ejection cartridges 56 and 78 described above.

Another feature of the cartridge carriage 40 disclosed herein is a latch 90 that is configured to apply a bidirectional force to the fluid ejection cartridge and/or cartridge and adapter to force the flexible circuit 58 into electrical contact with the contact pins 48 on the front wall 44 of the cartridge carriage 40. The latch 90 has a pivot arm 92 that pivotally attached on a first end 94 thereof between the sidewalls 42 adjacent the top wall 52 of the cartridge carriage 40 by means of pivot rod 96. A biased plunger 98 is pivotally attached to a distal end 100 of the pivot arm 92 wherein the biased plunger is configured to engage a sloped surface 102 of the fluid ejection cartridge 56, the sloped surface 104 of fluid ejection cartridge 78, or a sloped surface 106 of the adapter 82. The biased plunger 98 in contact with the sloped surface 102, 104 or 106 is effective to apply x and y directional forces on the fluid ejection cartridge and/or cartridge and adapter to force the flexible circuit 58 in intimate contact with the contact pins 48. In some embodiments, the latch 90 also includes a nub 108 that prevents over rotation of the latch 90 by contacting an underside of the top wall 52 (FIG. 12). The plunger 98 may be biased toward the sloped surface 102, 104 or 106 by a biasing device 110 selected from a coil spring and a resilient elastomeric structure such as a rubber plug or a bellows.

As set forth above, an advantage of the disclosed embodiments is that the same cartridge carriage may be used for a variety of ejection head swath lengths, and widths and at least two sizes of fluid ejection cartridges, thereby enabling a wide variety of fluid cartridges to be used with a single fluid ejection device.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A cartridge carriage comprising a cavity therein configured to hold a first fluid ejection cartridge in a fluid ejection device, the cavity comprising opposing side walls attached to a front wall, a bottom wall attached to the opposing side walls perpendicular to the front wall, a top wall distal from the bottom wall attached to the side walls and the front wall, and a latch attached between the sidewalls adjacent the top wall, the latch comprising a lever pivotally attached at a first end of the lever to the side walls and having a biased plunger pivotally attached on a pivot end of the biased plunger to the lever distal from the first end of the lever, wherein a distal end of the biased plunger is configured to engage a sloped surface of the first fluid ejection cartridge, wherein the front wall comprises a plurality of electrical contact pins and a first support ledge disposed apart from the electrical contact pins between the electrical contact pins and the top wall, wherein the first support ledge is configured to abut a first cartridge projection of the first fluid ejection cartridge to align the first fluid ejection cartridge with the plurality of electrical contact pins when the first fluid ejection cartridge is latched into the cartridge carriage.

2. The cartridge carriage of claim 1, wherein the distal end of the biased plunger is configured to apply both x and y directional forces to the sloped surface of the first fluid ejection cartridge.

3. The cartridge carriage of claim 1, wherein the lever further comprises a nub on the first end thereof configured to prevent the distal end of the lever from contacting the first fluid ejection cartridge.

4. The cartridge carriage of claim 3, wherein the latch mechanism further comprises a biasing device attached to the distal end of the biased plunger, wherein the biasing device is configured to engage the first end of the lever opposite the nub.

5. The cartridge carriage of claim 4, wherein the biasing device comprises a coil spring.

6. The cartridge carriage of claim 4, wherein the biasing device comprises a resilient elastomeric structure.

7. The cartridge carriage of claim 1, further comprising a cartridge adapter and second support ledge disposed apart from the electrical contact pins between the electrical contact pins and the first support ledge, wherein the second support ledge is configured to abut a second cartridge projection of a second fluid ejection cartridge to align the second fluid ejection cartridge with the plurality of electrical contact pins when the second fluid ejection cartridge and cartridge adapter are latched into the cartridge carriage.

8. The cartridge carriage of claim 1, wherein the bottom wall has an opening therein configured for one or more fluid ejection heads and for multiple ejection head sizes.

9. A cartridge carriage configured to hold a plurality of different fluid ejection cartridge sizes for a fluid ejection device, the cartridge carriage comprising opposing side walls attached to a front wall, a bottom wall attached to the opposing side walls perpendicular to the front wall, and a top wall distal from the bottom wall attached to the side walls and the front wall, wherein the opposing side walls, front wall, bottom wall, and top wall together define a cavity therein configured for the plurality of different fluid ejection cartridge sizes, wherein a latch is attached between the sidewalls adjacent the top wall, the latch comprising a lever pivotally attached at a first end of the lever to the side walls and having a biased plunger pivotally attached on a pivot end of the biased plunger to the lever distal from the first end of the lever, wherein a distal end of the biased plunger is configured to engage a sloped surface of a first fluid ejection cartridge, wherein the front wall comprises a plurality of electrical contact pins and at least two spaced-apart support ledges between the electrical contact pins and top wall, wherein a first one of the two spaced-apart support ledges is configured to abut a first cartridge projection of the first fluid ejection cartridge to align the first fluid ejection cartridge with the plurality of electrical contact pins when the first fluid ejection cartridge is latched into the cartridge carriage and a second one of the two spaced-apart support ledges is configured to abut a second cartridge projection of a second fluid ejection cartridge to align the second fluid ejection cartridge with the plurality of electrical contact pins when the second fluid ejection cartridge and an adapter therefor are latched into the cartridge carriage.

10. The cartridge carriage of claim 9, wherein each of the opposing side walls further comprise a recess therein configured for guiding the first and second fluid ejection cartridges into the cartridge carriage.

11. The cartridge carriage of claim 9, wherein the bottom wall has an opening therein, wherein the opening in the bottom wall is configured for multiple width and multiple length ejection heads on the first and second fluid ejection cartridges.

12. A fluid ejection device comprising the cartridge carriage of claim 9.

13. A method for reducing damage to a flexible circuits of a fluid ejection cartridge for a fluid ejection device, comprising:

providing a cartridge carriage comprising a cavity therein configured to hold a fluid ejection cartridge in the fluid ejection device, the cavity comprising opposing side walls attached to a front wall, a bottom wall attached to the opposing side walls perpendicular to the front wall, a top wall distal from the bottom wall attached to the front wall and the side walls, and a latch attached between the sidewalls adjacent the top wall, the latch comprising a lever pivotally attached at a first end of the lever to the side walls and having a biased plunger pivotally attached on a pivot end of the biased plunger to the lever distal from the first end of the lever, wherein a distal end of the biased plunger is configured to engage a sloped surface of the fluid ejection cartridge, wherein the front wall comprises a plurality of electrical contact pins and a first support ledge disposed apart from the electrical contact pins between the electrical contact pins and the top wall, and a second support ledge disposed apparat from the electrical contact pins between the electrical contact pins and the first support ledge;

tilting a fluid ejection cartridge in a first direction so that a cartridge projection of the fluid ejection cartridge is tilted toward the first support ledge while inserting the fluid ejection cartridge into the cavity or the fluid ejection cartridge is tilted toward the second support ledge while inserting the fluid ejection cartridge into the cavity;

when the cartridge projection of the fluid ejection cartridge abuts the first support ledge or the second support ledge, tilting the fluid ejection cartridge in a second direction opposite the first direction so that a bottom wall of the fluid ejection cartridge abuts bottom wall datum on the bottom wall of the cartridge carriage and the flexible circuit of the fluid ejection cartridge abuts the plurality of electrical contact pins;

and latching the fluid ejection cartridge in the cartridge carriage.

14. The method of claim 13, further comprising providing a cartridge adapter;

attaching the cartridge adapter to the fluid ejection cartridge prior to tilting the fluid ejection cartridge in the first direction while inserting the fluid ejection cartridge into the cavity so that the fluid ejection cartridges is tilted toward the second support ledge.

* * * * *